US005573625A

United States Patent [19]
Lovell et al.

[11] Patent Number: 5,573,625
[45] Date of Patent: Nov. 12, 1996

[54] APPARATUS FOR APPLYING POLYURETHANE LAYER TO TIRE SIDEWALL

[75] Inventors: John A. Lovell, Munroe Falls; Charles L. Makinson, North Canton; Charles J. Pearson; Robert K. Rossi, both of Akron, all of Ohio; David A. Du Vernay, Algonac, Mich.

[73] Assignee: The Goodyear Tire & Rubber Company, Akron, Ohio

[21] Appl. No.: 461,094

[22] Filed: Jun. 5, 1995

Related U.S. Application Data

[62] Division of Ser. No. 57,075, May 5, 1993, abandoned, which is a division of Ser. No. 690,646, Apr. 24, 1991, abandoned.

[51] Int. Cl.[6] ............................ B29D 30/72; B05D 1/26
[52] U.S. Cl. ........................ 156/356; 118/409; 152/524; 156/116; 156/394.1; 156/500
[58] Field of Search ........................ 156/116, 242, 156/398, 500, 356, 394.1; 152/524, 525, DIG. 12; 118/305, 207, 409; 427/286, 425

[56] References Cited

U.S. PATENT DOCUMENTS

| | | | |
|---|---|---|---|
| 2,782,757 | 2/1957 | Carnes | 118/305 |
| 2,800,874 | 7/1957 | Leslie | 118/305 |
| 3,218,208 | 11/1965 | Molen | 156/116 |
| 3,253,634 | 5/1966 | DeYoung | 152/353 |
| 3,427,215 | 2/1969 | Crocker | 156/408 |
| 3,638,704 | 2/1972 | Boileau | 152/353 |
| 3,648,748 | 3/1972 | Lovell | 152/353 |
| 3,764,455 | 10/1973 | Lovell | 161/162 |
| 3,910,228 | 10/1975 | Doll | 156/116 |
| 3,944,457 | 3/1976 | Podvin et al. | 156/405 |
| 4,009,072 | 2/1977 | Schultz et al. | 156/584 |
| 4,131,149 | 12/1978 | Roberts, Jr. | 152/357 A |
| 4,177,233 | 12/1979 | Roberts | 264/134 |
| 4,182,393 | 1/1980 | Larson | 152/353 |
| 4,222,810 | 9/1980 | Ytterstrom | 156/405 R |
| 4,379,904 | 4/1983 | Ehrlich et al. | 528/65 |
| 4,413,663 | 11/1983 | Sullenger | 152/353 R |
| 4,809,885 | 3/1989 | Hayashi et al. | 118/305 |
| 5,015,505 | 5/1991 | Cetnar | 427/286 |
| 5,124,340 | 6/1992 | Miller et al. | 152/524 |
| 5,300,164 | 4/1994 | DeTrano et al. | 156/116 |

FOREIGN PATENT DOCUMENTS

| | | |
|---|---|---|
| 1215829 | 3/1968 | United Kingdom . |
| WO8910835 | 11/1989 | WIPO . |

OTHER PUBLICATIONS

Encyclopedia of Polymer Science and Engineering, vol. 2, pp. 73 and 86–90 (1985).

*Primary Examiner*—Geoffrey L. Knable
*Attorney, Agent, or Firm*—Alvin T. Rockhill; Frederick K. Lacher

[57] ABSTRACT

A cured rubber tire has adhered thereto a layer of heated and mixed, productive urethane composition fluid sidewall material which has been flowed from a nozzle into a groove in the sidewall of a shaped tire. The tire is rotated under the nozzle a distance equal to the circumferential length of the groove so that the ends of the layer may be joined after which the flow of productive urethane composition sidewall material is terminated.

6 Claims, 6 Drawing Sheets

APPARATUS FOR APPLYING POLYURETHANE LAYER TO TIRE SIDEWALL

This is a Divisional of application Ser. No. 08/057,075, filed on May 5, 1993, now abandoned, which is a divisional application of Ser. No. 07/690,646, filed on Apr. 24, 1991, now abandoned.

This invention relates to a tire having a layer of polyurethane and to apparatus for applying the layer in accordance with the method of the invention. Heretofore various methods and materials have been employed to provide tires with polyurethane decorative, protective, and identifying laminates thereon. It has been difficult, however, to provide materials and apparatus which are suitable for the production of polyurethane colored sidewall tires and at the same time meet the required standards for appearance, quality, and durability.

In accordance with one aspect of the invention, there is provided a method of applying a sidewall stripe on a sidewall surface in a circumferentially extending continuous groove in a sidewall of a cured tire comprising:

a) positioning the tire on a support with the groove exposed;

b) shaping the tire;

c) mounting a nozzle over the groove for relative circumferential movement of the tire and the nozzle during application of the stripe in the groove by the nozzle;

d) adjusting the position of the nozzle relative to the sidewall;

e) moving the nozzle and the tire closer together for moving the nozzle into close proximity with the groove and maintaining a predetermined position relative to said groove with nozzle position control means responsive to the position of at least one side of the groove to track the position of the nozzle relative to the groove;

f) maintaining a predetermined distance between the nozzle and the sidewall surface with height control means responsive to the distance between the nozzle and the sidewall;

g) mixing a diisocyanate prepolymer with a compounded polyol base to produce a productive urethane composition having a viscosity of from about 5,000 to about 25,000 centipoise at a temperature of 120° F. (49° C.);

h) communicating the productive urethane composition fluid sidewall material to the nozzle;

i) continuously flowing the productive urethane composition fluid sidewall material into the groove with the nozzle over the circumferential length of the groove upon relative motion of the nozzle and the tire;

j) terminating flow of the productive urethane composition fluid sidewall material into the groove after application of the productive urethane composition fluid sidewall material over the length of the groove and joining the ends to form an uncured sidewall stripe;

k) separating the nozzle and the tire to remove the nozzle from the groove; and l) allowing the productive urethane composition in the uncured sidewall stripe to cure forming the sidewall stripe on the sidewall surface of the tire.

In accordance with another aspect of the invention, there is provided apparatus for applying a sidewall stripe to a sidewall surface in a circumferentially continuous groove in a sidewall of a tire comprising:

a) a support for holding the tire with the groove in a generally exposed position;

b) means to control the shape of the tire;

c) a nozzle mounted over the groove for flowing a productive urethane composition fluid sidewall material into the groove;

d) means to provide adjustment of the relative position of the nozzle and the sidewall;

e) means for moving the nozzle and the tire closer together for moving the nozzle into a predetermined position in close proximity with the groove and nozzle control means responsive to the position of at least one side of the groove to track the position of the nozzle relative to the groove;

f) height control means connected to the nozzle and responsive to the distance between the nozzle and the sidewall surface for maintaining a predetermined distance between the nozzle and the sidewall;

g) means for mixing a diisocyanate prepolymer with a compounded polyol base to produce a productive urethane composition having a viscosity of from about 5,000 to about 25,000 centipoise at a temperature of 120° F. (49° C.);

h) means to communicate the productive urethane composition fluid sidewall material to the nozzle;

i) means to continuously flow the productive urethane composition fluid sidewall material into the groove from the nozzle during relative movement of the nozzle and the tire over the circumferential length of the groove;

j) means to terminate flow of the productive urethane composition fluid sidewall material to the groove and joining the ends to form an uncured sidewall stripe after application of the polyol composition fluid sidewall material over the length of the groove; and k) means to separate the nozzle and the tire to remove the nozzle from close proximity to the groove.

In accordance with a further aspect of the invention, there is provided a tire which comprises a cured rubber toroidal-shaped carcass having spaced beads, rubber sidewalls and a rubber tread, at least one of the sidewalls having a circumferentially extending continuous groove, an adherent layer of polyurethane forming a stripe in the groove, the adherent layer of polyurethane being formed from a productive urethane composition fluid sidewall material flowed into the groove from a nozzle with the tire being shaped and with the groove in an exposed position, the productive urethane composition fluid sidewall material being prepared by mixing a diisocyanate prepolymer with a compounded polyol base to produce a productive urethane composition having a viscosity of from about 5,000 to about 25,000 centipoise at a temperature of 120° F. (49° C.) and communicated to the nozzle for flowing into the groove during relative movement of the nozzle and the tire, the flow of the productive urethane composition fluid sidewall material onto the tire sidewall being controlled by moving the nozzle into close proximity with the groove and by position control means responsive to the position of at least one side of the groove and the distance from the sidewall, and the flow of the productive urethane composition fluid sidewall material being terminated after application of the productive urethane composition fluid sidewall material over the length of the groove whereby the ends of the stripe are joined.

In accordance with a still further aspect of the invention, there is provided a productive urethane composition which can be applied to the sidewall of a tire and cured thereon as a decorative stripe, which is comprised of an admixture of (1) a diisocyanate prepolymer which is prepared by reacting (a) a hydroxyl terminated polydiene liquid rubber, (b) optionally, a pigment, (c) optionally at least one antidegradant, (d) optionally an alcohol containing at least 2 hydroxyl groups, (e) an effective amount of a catalyst, and (f) a polyisocyanate; and (2) a compounded polyol base which is comprised of (a) a hydroxyl terminated polydiene liquid rubber, (b) at least one pigment, (c) at least one antidegradant, (d) optionally, an alcohol containing at least 2 hydroxyl groups, and (e) at least one catalyst; wherein the ratio of the diisocyanate prepolymer to the compounded polyol base is within the range of about 1:5 to about 1:2.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

Figure 6:
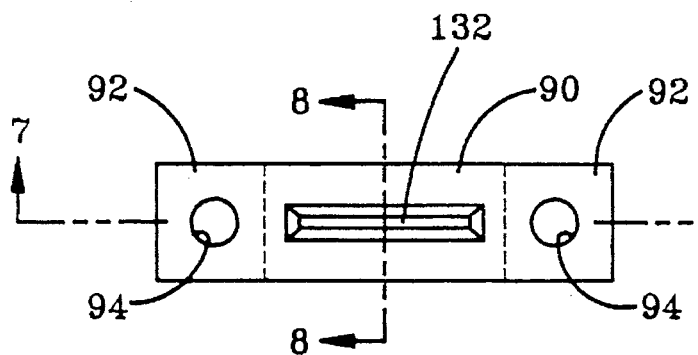
FIG. 6 is an end view of the nozzle taken along line 6—6 in FIG. 5.
Figure 7:
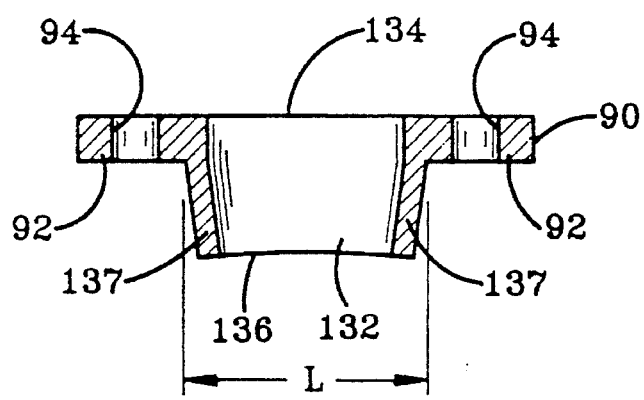
Figure 8:
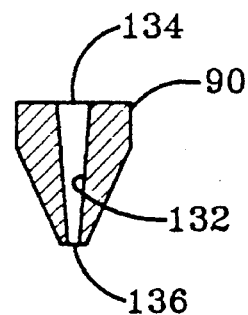

FIGS. 7 and 8 are detailed views of the nozzle tip taken along lines 7—7 and 8—8 in FIG. 6.

Figure 9:
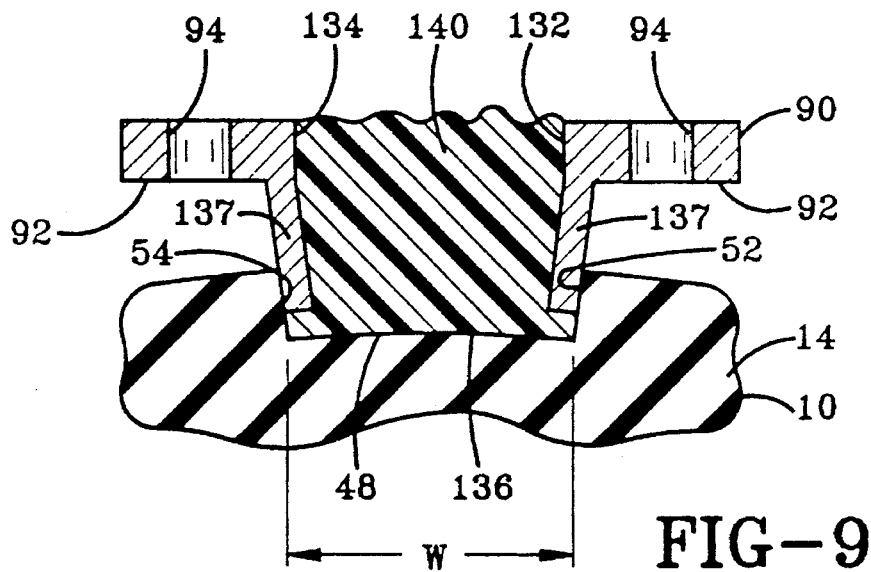

FIG. 9 is an enlarged sectional view like FIG. 7 showing the nozzle during application of the stripe on the groove.

Figure 1:
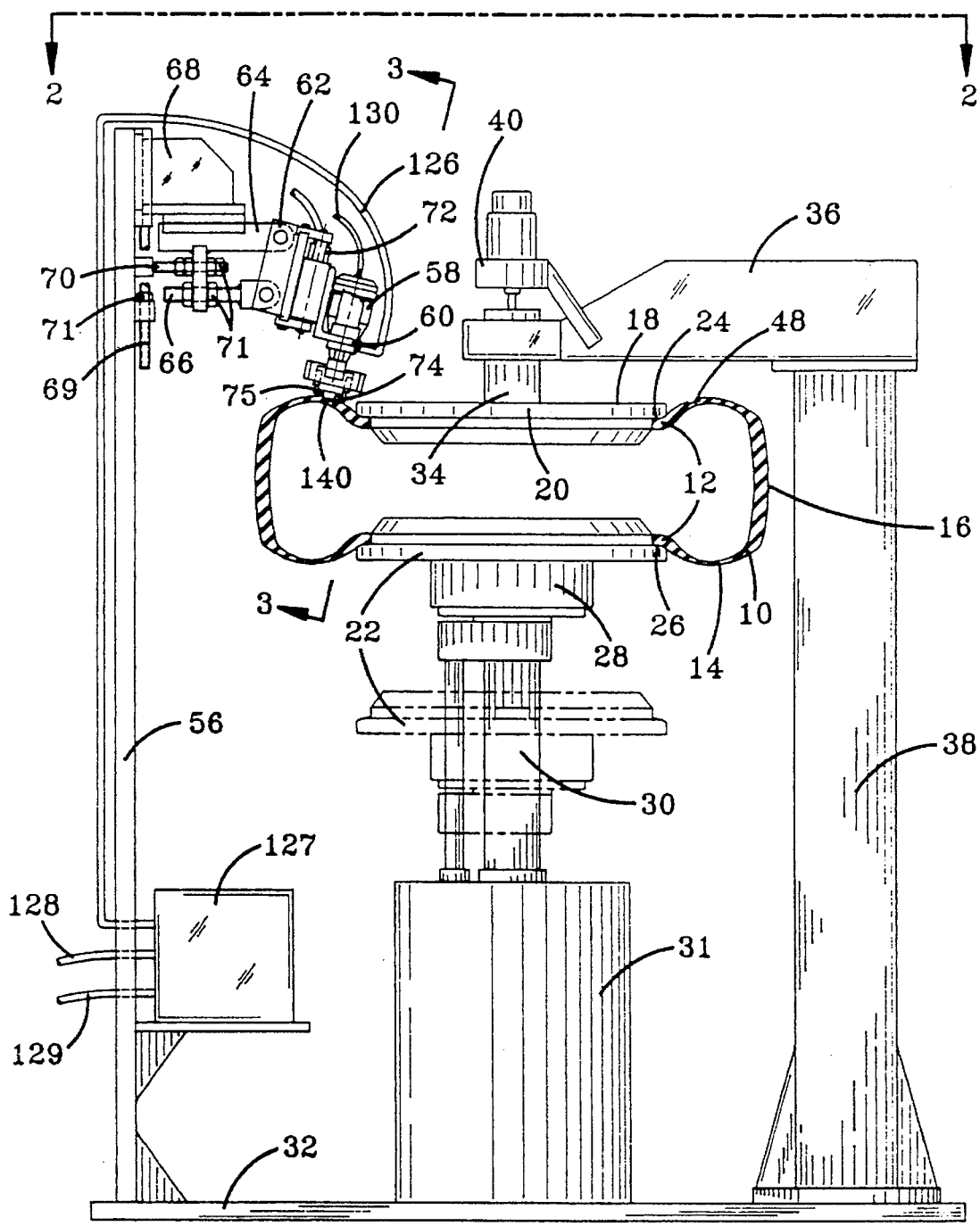
FIG. 1 is a schematic elevation with the tire shown in cross section of the apparatus embodying the invention and with parts being broken away showing the polyurethane stripe being applied to the tire.
Figure 2:
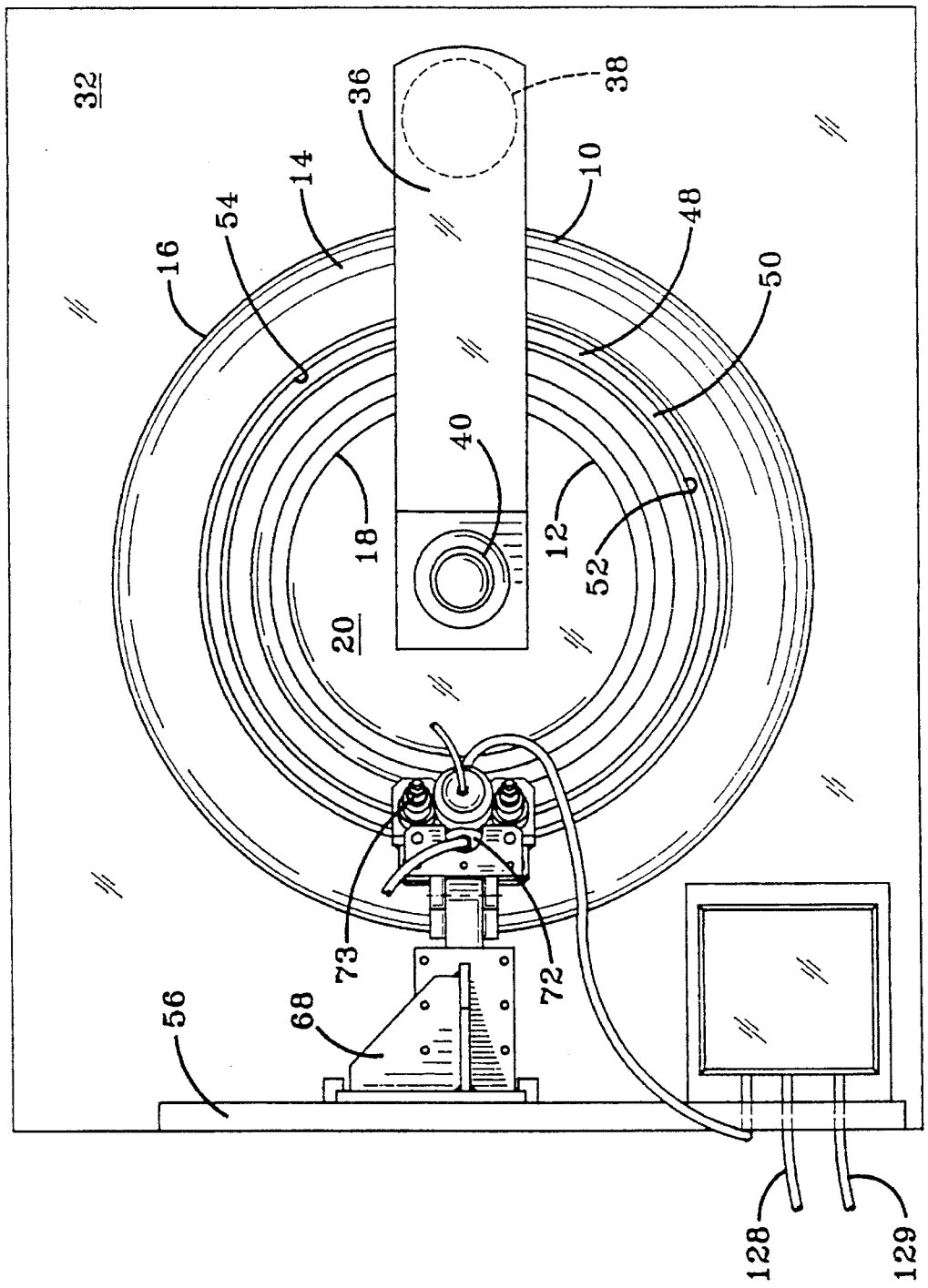
FIG. 2 is a plan view taken along line 2—2 in FIG 1 showing the tire sidewall and upper clamping ring.

Referring to the drawings and especially to FIGS. 1 and 2, a cured tire 10 which may be a cured rubber toroidal-shaped carcass having spaced beads 12, sidewalls 14 and a tread 16 is shown mounted on a chuck member 18. The chuck member 18 has a pair of bead retaining plates 20 and 22 with bead seats 24 and 26 for gripping the beads 12.

The lower bead retaining plate 22 is rotatably mounted on a boss 28 connected to a vertically movable shaft 30 supported by a piston cylinder assembly (not shown) in a housing 31 mounted on a base member 32. The upper bead retaining plate 20 is supported by an upper drive shaft 34 rotatably mounted on an arm 36 supported by a pedestal 38 fastened to the base member 32. The drive shaft 34 is rotated by a suitable drive means such as a chain drive connected to a motor and reducer not shown. An encoder 40 may be mounted on the arm 36 and connected to the drive shaft 34 for registering the position of rotation of the bead retaining plate 20.

The lower bead retaining plate 22 may be lowered from the position shown in full lines to the position shown in dot-dash lines in FIG. 1 so that the tire 10 may be placed over the plate manually or preferably by a conveyor (not shown). Then the lower bead retaining plate 22 may be raised to the position shown in full lines in FIG. 1 to seat the beads 12 on the chuck member 18. Shaping may be provided by inflating the tire with an inner tube or other suitable means (not shown). The shape of the tire 10 may be controlled by raising the lower bead retaining plate 22 to different heights.

One of the sidewalls 14 has a circumferential groove 48 in the sidewall surface 50 with circumferential sides 52 and 54.

Figure 3:
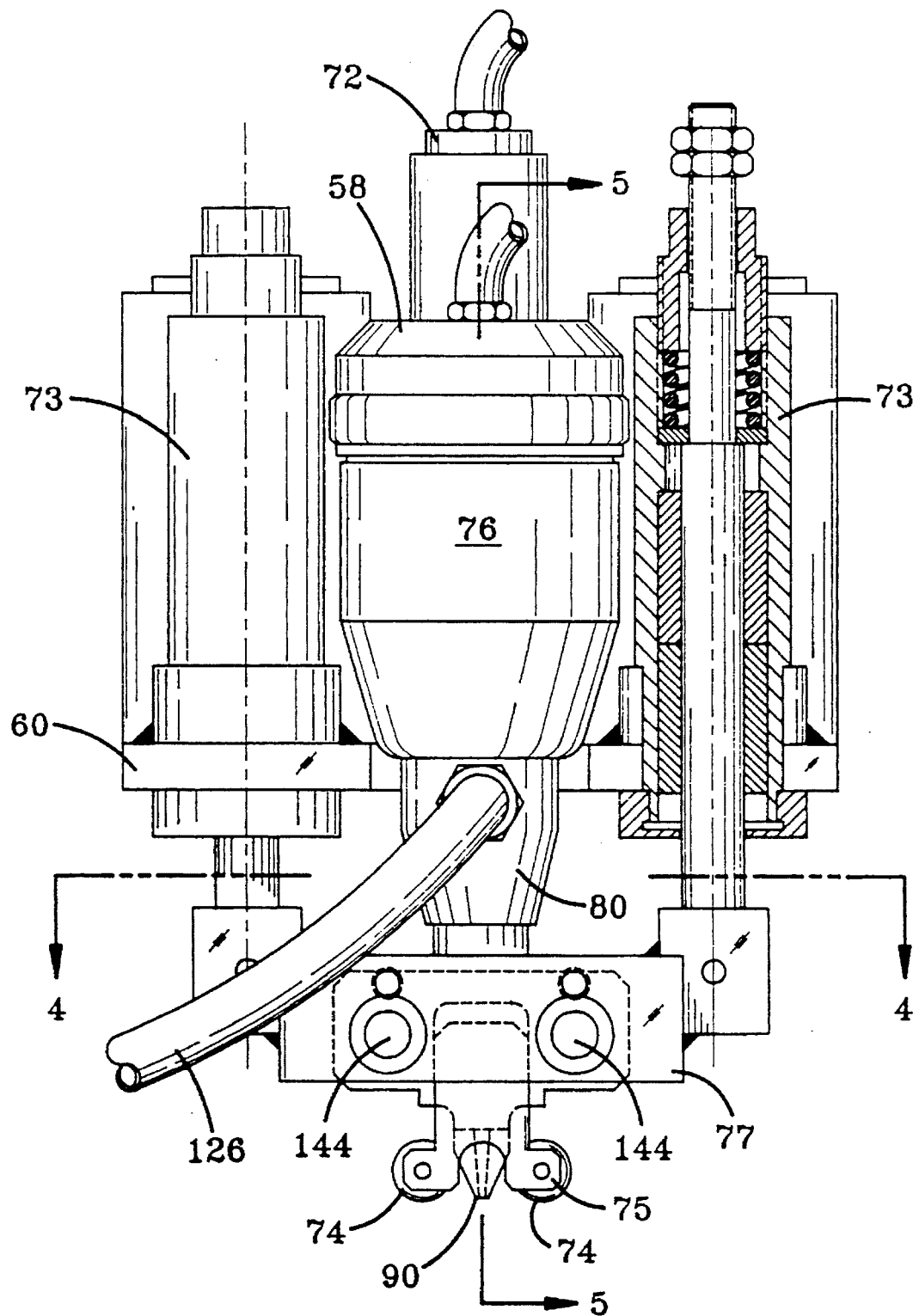
FIG. 3 is an enlarged view of the nozzle taken along line 3—3 in FIG. 1 with the parts being broken away.
Figure 4:
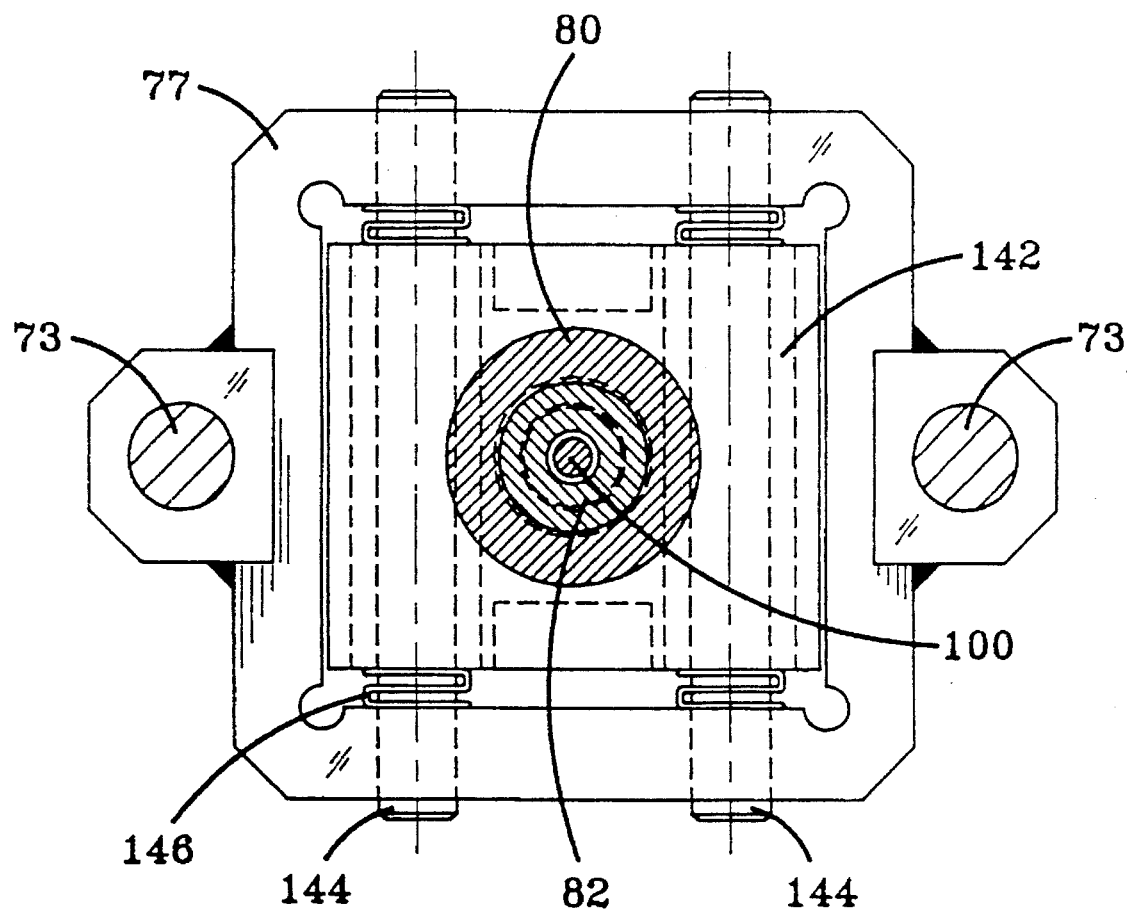
FIG. 4 is a sectional view taken along line 4—4 in FIG. 3.
Figure 5:
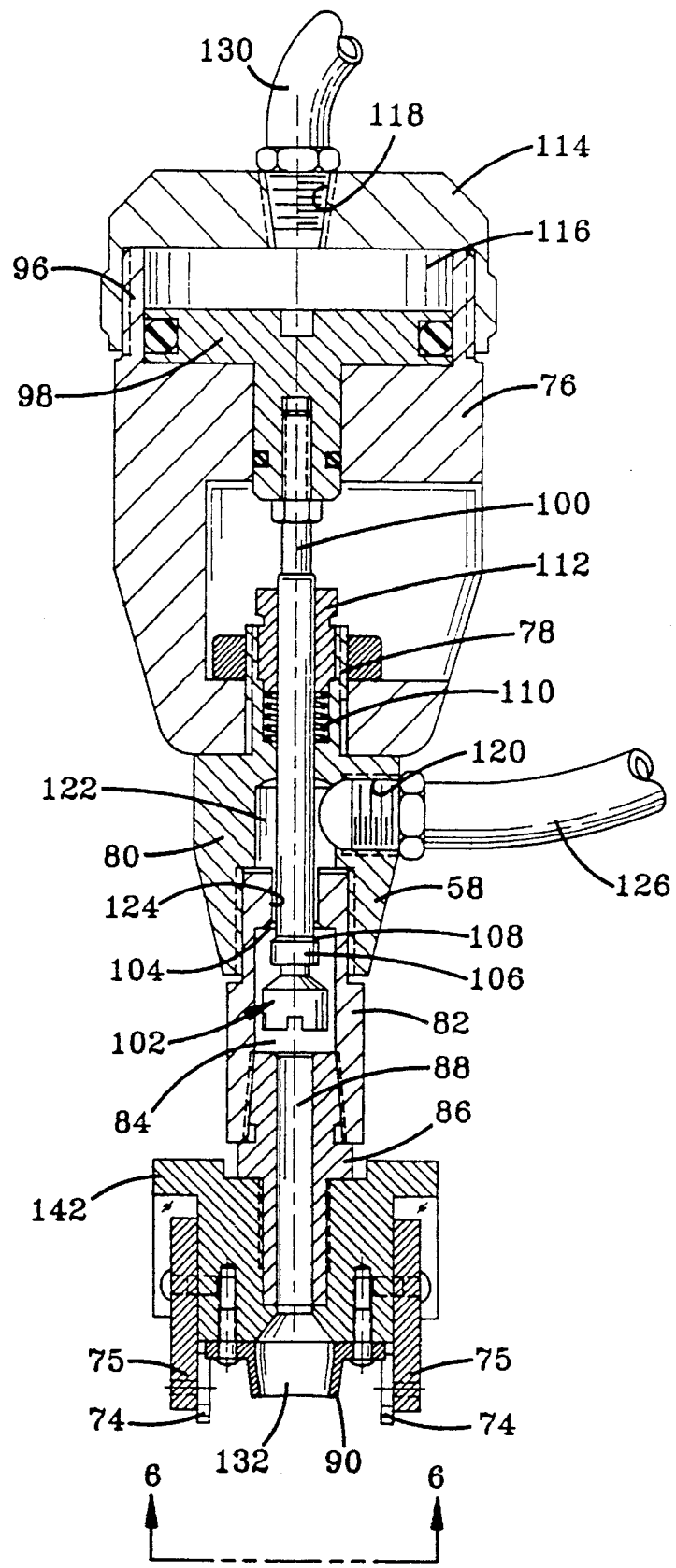
FIG. 5 is an enlarged sectional view of the nozzle taken along line 5—5 in FIG. 3.

An upright support such as bar 56 is mounted on the base member 32 and is positioned along one side of the bead retaining plates 20 and 22 for supporting a nozzle 58 shown in greater detail in FIGS. 3, 4 and 5. The nozzle 58 is mounted on a frame 60 which is vertically movable on a swinging arm 62 pivotally connected to horizontal positioning bars 64 and 66. As shown in FIG. 1 the upper horizontal positioning bar 64 is slidably movable in a horizontal direction on a suitable bracket 68 to move the nozzle 58 radially of the tire 10 as shown in FIG. 2 by moving the upper horizontal positioning bar 64. The lower horizontal positioning bar 66 which has a threaded rod may then be moved horizontally to tilt the swinging arm 62 so that the nozzle 58 will be substantially at right angles to the sidewall surface 50 between the sides 52 and 54 of the groove 48 in the sidewall surface. Vertical adjustment of the bracket 68 on the bar 56 is provided by a threaded rod 69 mounted on the bar and extending upwards to the bracket. Horizontal adjustment of the frame 60 is limited by a threaded rod 70 mounted on the pedestal 56 and extending through the link connecting the upper horizontal positioning bar 64 and the lower horizontal positioning bar 66. The threaded rods 69 and 70 and the rod on positioning rod 66 have stop nuts 71 which are adjustable to position the frame 60.

As shown in FIGS. 1, 2 and 3, piston cylinder assembly 72 is mounted on the frame 60 for raising and lowering the nozzle 58 relative to the sidewall surface 50. The piston cylinder assembly 72 may be actuated by air pressure and be in communication with a suitable source of air pressure. The height of the nozzle 58 relative to the sidewall surface 50 on the slide assemblies 73 may be controlled by rollers 74 mounted on roller arms 75 connected to nozzle yoke 77 so that the rollers 74 are engagable with the sidewall surface 50 and will raise and lower the nozzle 58 in response to variations in the height of the sidewall surface. Other suitable height measuring and controlling means such as a laser and/or machine vision apparatus may be used if no contact is desired.

Referring to FIG. 5, a more detailed view of the nozzle 58 is shown to illustrate the mechanism for controlling the flow of fluid sidewall material to the circumferential groove 48 in the sidewall surface 50 of the tire 10. The nozzle 58 has an upper housing 76 connected by a threaded tubular member 78 to a lower housing 80. A cylindrical valve body member 82 is in threaded engagement with the lower housing 80 and has a valve chamber 84 which is enclosed by a nozzle tip extension 86 having a passage 88 in communication with a nozzle tip 90 shown more clearly in FIGS. 6 through 9. The nozzle tip 90 may have flanges 92 with bolt holes 94 for fastening to the nozzle tip extension 86 and to the frame 60.

The upper housing 76 includes a cylinder 96 for a piston 98 connected to a rod 100 extending to a poppet valve 102 in the valve chamber 84. A valve seat 104 is provided in the valve body member 82 and a poppet valve spool 106 is mounted on the rod 100 so that upon axial movement of the rod a sealing surface 108 on the spool may be moved into and out of engagement with the valve seat. A spring 110 is seated in the tubular member 78 of the lower housing 80 for engagement with a retainer nut 112 fastened on the rod 100 for urging the sealing surface 108 of the spool 106 against the valve seat 104 to close the valve 102.

A head 114 is threaded over the cylinder 96 of the upper housing 76 to enclose an air chamber 116 in communication with a suitable source of air pressure through a port 118 in the head. It is normally convenient to utilize air pressure. However, hydraulic pressure can be utilized.

An inlet 120 in the lower housing 80 is in communication with an inlet chamber 122 opening on a valve passage 124 in the valve body member 82 in communication with the valve chamber 84. A hose 126 or other suitable conduit may be mounted in the inlet 120 and be in communication with a source of fluid sidewall material such as a mixing and pressure applying apparatus 127 shown schematically in FIG. 1. Feed line 128 for diisocyanate prepolymer and feed line 129 for compounded polyol base shown schematically in FIG. 1 are connected to the mixing and pressure applying apparatus 127.

In FIG. 5 the nozzle 58 is shown in the open position with the port 118 connected to a suitable hose 130 in communication with a source of compressed air such as an air compressor (not shown) for increasing the pressure in the air chamber ! 16 and urging the piston 98 away from the head 114 to open the poppet valve 102 and permit passage of the fluid sidewall material through the passage 88 to the nozzle tip 90 and through a nozzle tip passage 132 into the groove 48 of the tire 10 to form a stripe 137.

Referring to FIGS. 6, 7 and 8, the nozzle tip 90 is shown in greater detail. The tip passage 132 is tapered from the inlet end 134 to the outlet end 136 from a generally circular cross section above the inlet end to an elongated slit-like opening 138 at the outlet end. The tip passage 132 may be shaped with the walls having a coat hanger configuration so that the fluid sidewall material will maintain a laminar flow over a greater distance than the length of the laminar flow provided by the flat walls of the nozzle tip 90 shown in FIGS. 5–9. The outlet end 136 has edges which are arched to conform with the curvature of the sidewalls 14 to provide a uniform thickness of fluid sidewall material 140. End walls 137 of the nozzle tip 90 are also tapered for engagement with the sides 52 and 54 of the groove 48 as shown in FIG. 9. Preferably the length L of the nozzle tip 90 is greater than the width W of the groove 48 so that the nozzle tip will be pressed against the sides of the groove providing a desired flow of the fluid sidewall material 140 into edges of the circumferential groove. In this embodiment, the engagement of the end walls 137 of the nozzle tip 90 control the radial position of the nozzle 58 by sliding movement of a frame 142 in the yoke 77 carried by the spring loaded slide assemblies 73. The yoke 77 has rods 144 supporting the frame 142 and springs for stabilizing the frame movement. Other radial nozzle position control means such as a laser and/or machine vision apparatus responsive to the position of at least one side of the groove 48 may be utilized where contact of the nozzle 58 with the tire 10 is not desirable.

It has been found that a preferred fluid sidewall material 140 for application to a cured tire 10 of rubber or other rubber like material is a productive urethane composition fluid sidewall material having a viscosity of from about 5,000 to 25,000 centipoises at a temperature of 120° F. (48.9° C.). The productive urethane composition is prepared by admixing a diisocyanate prepolymer and a compounded polyol base. The compounded polyol base is comprised of (a) a hydroxyl terminated polydiene liquid rubber, (b) optionally, a pigment, (c) at least one antidegradant, (d) optionally, an alcohol containing at least 2 hydroxyl groups, and (e) an effective amount of a catalyst. The compounded polyol base will typically contain from about 5 to about 120 phr (parts per hundred parts of rubber) of the pigment, from about 0.1 to about 6 phr of the antidegradant from about 0.5 to about 20 phr of the alcohol, and an effective amount of the catalyst. It is generally preferred for the compounded polyol base to contain from about 20 to about 100 phr of the pigment, from about 1 to about 6 phr of the antidegradant, and from about 1 to about 10 phr of the alcohol. It is most preferred for the pigment to be present at a level which is within the range of about 50 to about 80 phr, for the antidegradant to be at a level within the range of about 2 to about 4 phr, and for the alcohol to be present in an amount within the range of about 2 to about 5 phr.

The diisocyanate prepolymer is prepared by reacting a hydroxyl terminated polydiene liquid rubber, a polyisocyanate, and optionally an alcohol containing at least 2 hydroxyl groups. The reaction mixture utilized in the preparation of the diisocyanate prepolymer will also contain optionally at least one antidegradant, a catalyst, and optionally, a pigment. Thus, the diisocyanate prepolymer is made by reacting (a) a hydroxyl terminated polydiene liquid rubber, (b) optionally, a pigment, (c) optionally an antidegradant, (d) optionally, an alcohol containing at least 2 hydroxyl groups, (e) a catalyst, and (f) a polyisocyanate. Normally, all of the pigments and antidegradants are incorporated into the compounded polyol base. However, it is possible to incorporate the pigments and antidegradants into the diisocyanate prepolymer.

The hydroxyl terminated polydiene liquid rubber is comprised of repeat units which are derived from 1 or more conjugated diene monomers or nonconjugated diene monomers. It is generally preferred for the hydroxyl terminated polydiene liquid rubber to be comprised of repeat units which are derived from conjugated diene monomers such as 1,3-butadiene or isoprene. Such hydroxyl terminated polydiene liquid rubbers can also contain repeat units which are derived from vinyl aromatic monomers, such as styrene. Some representative examples of suitable hydroxyl terminated polydiene liquid rubbers include hydroxyl terminated liquid polybutadiene, hydroxyl terminated liquid polyisoprene, hydroxyl terminated liquid styrene-butadiene rubber, hydroxyl terminated liquid nitrile rubber (liquid butadiene-acrylonitrile rubber), hydroxyl terminated liquid isoprene-styrene rubber, hydroxyl terminated liquid isoprene-butadiene rubber, and hydroxyl terminated liquid styrene-isoprene-butadiene rubber. The hydroxyl terminated polydiene liquid rubber will typically have a hydroxyl functionality of from about 2.2 to about 2.6. They typically have a viscosity at about 30° C. of from about 10 poise to 150 poise and preferably have a viscosity which is within the range of about 20 poise to about 100 poise.

The pigments utilized can be of any desired color. For example, diarylid yellow 17, pththalocy blue 15, diarylid orange 13, or perm red 28 (red 48;1) could be used to impart a yellow, blue, orange or red color. Because white sidewall tires are very popular, in most cases white pigments will be employed. The white pigment will also typically act as a rubber reinforcing filler. A wide variety of inorganic materials can be utilized for this purpose. Titanium dioxide, calcium carbonate, and zinc oxide are representative examples of materials which can be utilized as the white pigment. Zinc oxide and calcium carbonate act as catalysts when titanium dioxide is present. It is highly preferred to utilize from 5 to 15 parts of zinc oxide, from 5 to 15 parts of calcium carbonate, and from 40 to 60 parts of titanium dioxide as the white pigment (said parts being per 100 parts of the compounded polyol base). The antidegradant can be an antioxidant, an antiozonant, an ultraviolet light stabilizer or any combination thereof. It is highly preferred for an antioxidant, an antiozant and an ultraviolet stabilizer be present.

The alcohol containing at least 2 hydroxyl groups will typically be a diol or a triol. Some representative examples of suitable alcohols include ethylene glycol, 1,3-propane diol, 1,4-butane diol, 1,5-pentane diol, 1,6-hexane diol, 1,8-octane diol and trimethylol propane. Preferred alcohols include 1,4-butane diol, 1,6-hexane diol, and trimethylol propane. In most cases, it is highly preferred to utilize 1,4-butane diol as the alcohol. If the hydroxyl terminated polydiene liquid rubber has a hydroxyl functionality of less than about 2.4, it will generally be necessary to include such an alcohol in the diisocyanate prepolymer and the compounded polyol base.

The catalyst is used to increase the reaction rate between the hydroxyl terminated polydiene rubber and the polyisocyanate. The amount of catalyst utilized will be adjusted to attain the desired reaction rate. This will be dependent upon the specific design and operating conditions of the equipment being utilized. In cases where there is a short residence time in the equipment from the point of mixing in the mixing and pressure applying apparatus 128 to application from the nozzle 58, a relatively large concentration of catalyst will be required to cure the productive urethane composition. On the other hand, in cases where the equipment provides a longer residence time after mixing, a relatively lower amount of catalyst will be required. The curing reaction is somewhat temperature dependent with higher temperatures generally promoting a faster rate of curing. Accordingly, lesser amounts of catalyst is required at higher curing temperatures. The temperature utilized to cure the productive urethane composition will generally be within the range of about 20° C. to about 150° C.

Any catalyst which increases the reaction rate between the diisocyanate prepolymer and the compounded polyol base can be utilized. Some representative examples of such catalysts include dibutyltin dilaurate, stannous octoate, magnesium oxide, butyl aldehyde-butyl amine condensation product, 2-mercaptobenzothiazole, cobalt naphthenate and tertiary amines such as triethylene diamine, methylated tetraethylene tetramine and hexamethylene tetramine. It has been found that the organo tin compounds such as dibutyltin dilaurate and stannous octoate are quite useful in this regard. It is normally preferred to utilize a combination of an alkyl tin mercaptide and an organo tin carboxylate as the catalyst system. The utilization of from about 0.003 phr to about 0.007 phr of an alkyl tin mercaptide in conjunction with from about 0.003 phr to about 0.007 phr of an organo tin carboxylate as the catalyst system is highly preferred.

Aliphatic polyisocyanates or aromatic polyisocyanates can be utilized. The polyisocyanate will typically be a diisocyanate. Some representative examples of suitable polyisocyanates include 1,6-hexamethylene diisocyanate, 1,10-decamethylene diisocyanate, 1,4-cyclohexylene diisocyanate, 4,4'-methylene-bis(cyclohexyl-isocyanate), 1,5-tetrahydronaphthalene diisocyanate, isophorone diisocyanate, 2,4-toluene diisocyanate, 2,6-toluene diisocyanate, m-phenylene diisocyanate, diphenyl-methane-4,4'-diisocyanate, 3,3'-dimethyl-4,4-bis phenylene diisocyanate and the like.

In preparing the productive urethane composition, the diisocyanate prepolymer will be mixed with a compounded polyol base at a weight ratio which is within the range of about 1:5 to about 1:2. It is typically preferred for the diisocyanate prepolymer to be mixed with the compounded polyol base at a weight ratio which is within the range of about 1:4 to about 2:5.

This material 140 may be continuously mixed in the mixing and pressure applying apparatus 127 and communicated to the nozzle 58 by the hose 126 for continuous flow during application of the material to the circumferential groove 48 of the tire 10. After application, the nozzle 58 may be retracted by actuating the piston cylinder assembly 72 on the frame 60 which retracts the yoke 77, slide assemblies 73 and roller arms 74. The cured tire 10 may then be removed by lowering the lower bead retaining plate 22. The tire 10 may then be lifted off the lower bead retaining plate 22 and a second tire placed on the chuck member 18. The nozzle 58 may then be moved into the position shown in FIGS. 1 and 9 and the air pressure admitted to the air chamber 116 so that the poppet valve 102 is open communicating the productive urethane composition fluid sidewall material 140 to the nozzle tip 90. Simultaneously, the chuck member 18 is rotated causing the tire 10 to rotate. Suitable controls well known to those skilled in the art such as encoder 40 may be provided to measure the amount of rotation of the tire 10 and cause closing of the poppet valve 102 and retraction of the nozzle 58 from the groove 48 after one revolution of the tire.

Preferably the volume of productive urethane composition 140 held in the system between shots is no more than one half the volume of material to lay one stripe and this mixed volume is held for a period of time no longer than the pot life of the material. This will be less than about 4 minutes and preferably less than about 2 minutes. The first fluid sidewall material 140 applied to the circumferential groove 48 is preferably not fully cured when the last fluid sidewall material is applied to provide adhesion of the ends at the splice. The tire 10 is also not removed from the chuck 20 until the material 140 is sufficiently solidified to prevent undesirable flow of the material from the position where it is applied to the tire.

In the embodiment shown, both sides 139 of the nozzle tip 90 are shown in engagement with the sides 52, 54 of the groove 48. This is desirable, however, the groove 48 may also be adequately filled with the fluid sidewall material 140 where only one of the sides 139 is in engagement with one of the sides 52, 54 of the circumferential groove 48. This will maintain the nozzle 58 in the groove 48 even though the chuck member 18 or the tire 10 is not mounted concentrically.

By utilizing the method and apparatus of this invention, one or more colored stripes (rings) can be applied to the sidewall of a tire. In fact, multiple stripes of different colors can be applied to the sidewall of the same tire using the method of this invention.

While a certain representative embodiment and details have been shown for the purpose of illustrating the invention, it will be apparent to those skilled in the art that various changes and modifications may be made therein without departing from the spirit or scope of the invention.

What is claimed is:

1. Apparatus for applying a sidewall stripe to a sidewall surface in a circumferentially continuous groove in a sidewall of a tire comprising:

a) a support for holding said tire with said groove in a generally exposed position;

b) means to control the shape of said tire;

c) a nozzle mounted over said groove on a frame supported for radial movement in a radial positioning assembly for flowing a productive urethane composition fluid sidewall material into said groove;

d) means to provide adjustment of the relative angular position between said nozzle and said sidewall surface;

e) means for moving said nozzle and said tire closer together for moving said nozzle into a predetermined position in close proximity with said groove and for separating said nozzle and said tire to remove said nozzle from close proximity with said groove, and nozzle position control means including said frame supported for radial movement responsive to the position of at least one side of said groove to track the position of said nozzle relative to said groove;

f) height control means connected to said nozzle and responsive to the distance between said nozzle and said sidewall surface for maintaining a predetermined distance between said nozzle and said sidewall;

g) means for mixing a diisocyanate prepolymer with a compounded polyol base to produce a productive urethane composition having a viscosity of from about 5,000 to about 25,000 centipoise at a temperature of 120° F. (49° C.);

h) means to communicate said productive urethane composition fluid sidewall material to said nozzle;

i) means to continuously flow said productive urethane composition fluid sidewall material into said groove from said nozzle during relative movement of said nozzle and said tire over the circumferential length of said groove; and j) means to terminate flow of said productive urethane composition fluid sidewall material to said groove and joining the ends to form an uncured sidewall stripe after application over the length of said groove.

2. Apparatus as specified in claim 1 wherein said support includes a chuck member having an upper bead retaining plate and a lower bead retaining plate for engaging beads of said tire and said means to control the shape of said tire includes means for raising said lower bead retaining plate.

3. Apparatus as specified in claim 1 wherein said height control means includes a roller connected to said frame supported for radial movement and said roller being positioned for engagement with a surface of said sidewall for raising and lowering said nozzle in response to variations in the height of said surface.

4. Apparatus as specified in claim 1 wherein said nozzle has a tip with an inlet end and an outlet end, with a tip passage tapered from said inlet end to said outlet end from a generally circular cross section above said inlet end to an elongated slit-like opening at said outlet end.

5. Apparatus as specified in claim 4 wherein said nozzle tip has end walls for engaging at least one side of said groove and said end walls are tapered for insertion into said groove.

6. Apparatus as specified in claim 1 wherein said means to separate said nozzle and said tire to remove said nozzle from close proximity to said groove includes at least one piston-cylinder assembly mounted on a supporting frame and in communication with a source of air pressure to actuate said piston cylinder assembly.

* * * * *